Patented June 10, 1952

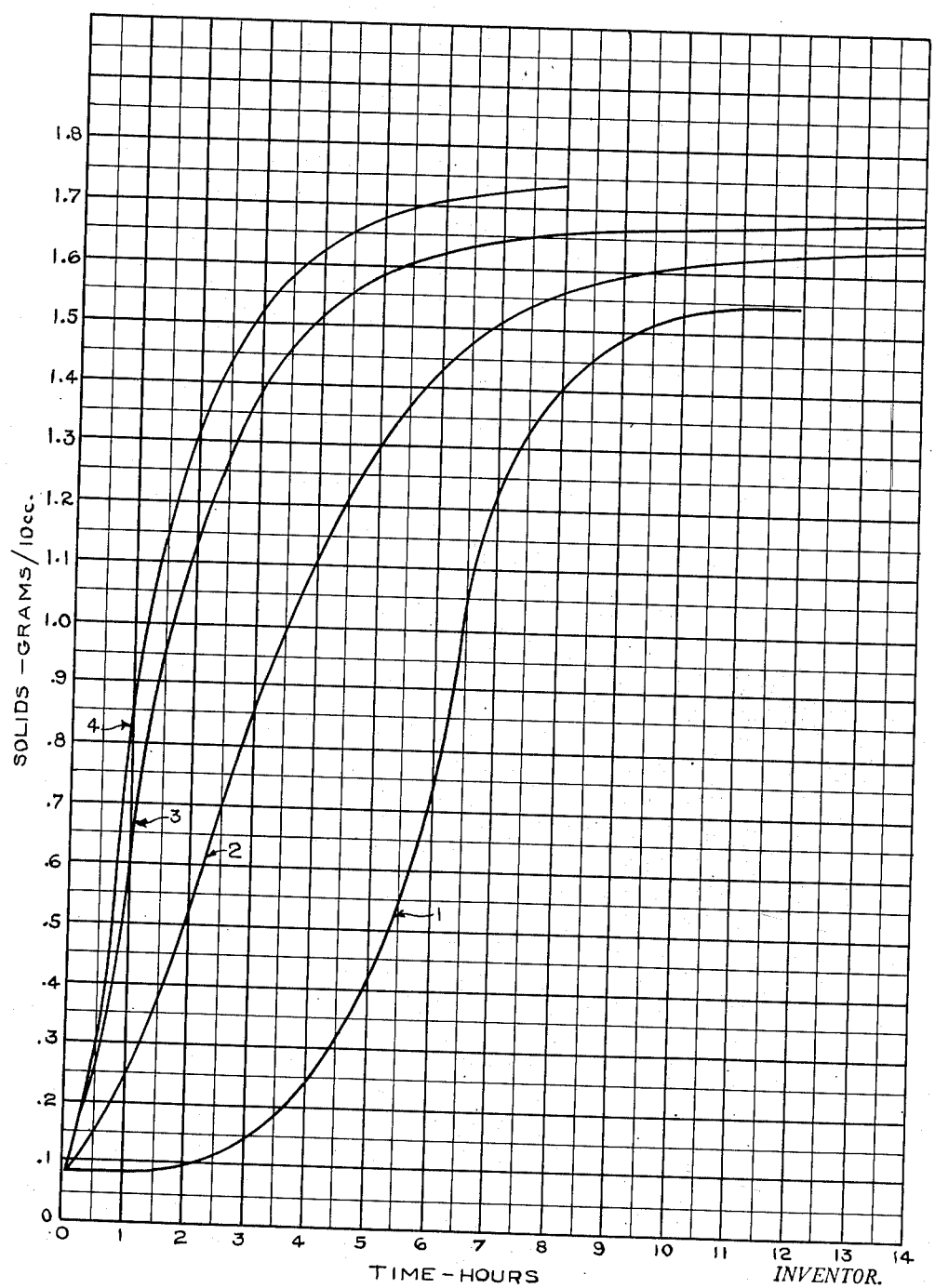

2,599,616

UNITED STATES PATENT OFFICE 2,599,616

AGEING AND POLYMERIZING IMPURE METHYL VINYL KETONE

Richard E. Davies, Ridgewood, N. J., assignor to Celanese Corporation of America, a corporation of Delaware Application April 15, 1949, Serial No. 87,738

8 Claims. (Cl. 260—63)

This invention relates to polymers and relates more particularly to the preparation of polymeric methyl vinyl ketone.

As is well known, it is necessary to add a small quantity of a polymerization inhibitor to monomeric methyl vinyl ketone to prevent its premature polymerization during shipping and storage. In polymerizing this monomeric methyl vinyl ketone, containing an added polymerization inhibitor, it has heretofore been the practice to distill or otherwise treat the monomer immediately prior to the polymerization process to separate the polymerization inhibitor therefrom, following which the monomer was polymerized in the presence of a polymerization catalyst. In many cases, the polymeric methyl vinyl ketone obtained by this process was a dark colored, soft, rubbery mass, insoluble or only partly soluble in common organic solvents, such as acetone, and unstable, particularly at elevated temperatures. While some improvements in the physical properties of the polymer could be obtained by careful purification of the monomer before polymerization and by close control of the polymerization conditions, these improvements were not reproducible, especially when different batches of monomer were employed and when the polymerization was effected in an aqueous medium.

It is an important object of this invention to provide a process for preparing polymeric methyl vinyl ketone which will be free from the foregoing and other disadvantages of the prior processes.

A further object of this invention is the provision of an improved process for preparing polymeric methyl vinyl ketone which will consistently yield a polymer that is a clear, colorless, hard mass, soluble in organic solvents and stable even at elevated temperatures.

Another object of this invention is the provision of an improved process for preparing polymeric methyl vinyl ketone, wherein a methyl vinyl ketone monomer substantially free from added polymerization inhibitors is aged before polymerization.

Other objects of this invention will be apparent from the following detailed description and claims.

I have now discovered that the poor physical properties of polymeric methyl vinyl ketone are caused by the presence of vinyl acetylene in the methyl vinyl ketone monomer from which said polymer is prepared. The vinyl acetylene is either a by-product formed during the preparation of the methyl vinyl ketone, or the unreacted and unseparated portion of the vinyl acetylene from which the methyl vinyl ketone is produced. Since even traces of vinyl acetylene are sufficient to impart poor physical properties to the polymeric methyl vinyl ketone, removal of the vinyl acetylene by ordinary methods, such as distillation, is both difficult and expensive. In accordance with my invention, I render the vinyl acetylene innocuous by ageing a methyl vinyl ketone monomer containing the same, and substantially free from added polymerization inhibitors, in the presence of oxygen. After ageing, the methyl vinyl ketone monomer may be polymerized to yield consistently a polymer that is a clear, colorless, hard mass, soluble in organic solvents and stable even at elevated temperatures. Moreover, the rate of polymerization of the monomer is greatly increased by the ageing thereof, with the result that its polymerization may be effected in a shorter period of time than has hitherto been considered necessary. Ageing of the methyl vinyl ketone monomer also increases the yield of the polymer as compared with the yield obtainable by the polymerization of the unaged monomer, thereby reducing the quantity of methyl vinyl ketone monomer remaining in said polymer, which reduction is highly desirable since the methyl vinyl ketone monomer is a strong lachrymatory agent.

In the accompanying drawing, the figure shows graphically the rate of polymerization of methyl vinyl ketone after ageing for different periods of time.

In carrying out my invention, a methyl vinyl ketone monomer, containing an added polymerization inhibitor, is first distilled or otherwise treated to remove the added polymerization inhibitor therefrom. Thereafter, the monomer, which is now substantially free from added polymerization inhibitors, but which may still contain certain impurities that tend to inhibit polymerzation, is aged n the presence of oxygen until a polymer produced therefrom has the desired physical properties, such as solubility in common organic solvents, stability, clarity and hardness. The oxygen may be applied to the monomer in the form of air, or pure gaseous oxygen may be brought into contact with the monomer. The period of ageing will depend upon the manner in which the methyl vinyl ketone monomer and oxygen are mixed, and may range from as little as about 2 hours when a stream of pure gaseous oxygen is bubbled through the monomer to as long as about 72-144 hours, or even longer, when the monomer is exposed to the air in bulk. The methyl vinyl ketone monomer is preferably maintained at a temperature of between about 0° C. and 10° C. during the ageing to prevent the premature formation of any appreciable quantities of polymer therein. When the methyl vinyl ketone monomer is to be polymerized within about 3 hours after it has been produced, it will be unnecessary to add any polymerization inhibitors thereto. Instead the methyl vinyl ketone monomer may be aged immediately after it is produced if it is free from impurities. Where the methyl vinyl ketone monomer contains impurities, it may be aged after having been purified by distillation or in any other desired manner.

The aged methyl vinyl ketone monomer can be polymerized alone or with other polymerizable substances in bulk to produce a solid, in organic solvents to produce a solution, or in an aqeous medium to produce a latex. During the polymerization, there may be present in the polymerization medium a suitable catalyst such as potassium persulfate, hydrogen peroxide, benzoyl peroxide or per acids in an amount ranging from about 0.0005 to 0.001 part by weight for each part by weight of the methyl vinyl ketone. As is well known, these polymerization catalysts cause the polymerization of the methyl vinyl ketone monomer to take place through the carbon to carbon double bond. In addition, when the polymerization of the methyl vinyl ketone monomer is effected in an aqueous medium, there may also be present in said medium a small quantity of an emulsifying agent, such as sodium dioctyl sulfosuccinate, the condensation product of oleic acid chloride and 2-chloro-ethylamine heated with sodium sulfite, or polyvinyl alcohol to prevent the agglomeration and separation of the polymer from the medium.

The polymerization of the aged methyl vinyl ketone monomer proceeds at a much more rapid rate than does the polymerization of the unaged monomer. As a result, the time necessary for complete polymerization of the aged monomer in an aqueous medium is only about 60% of the time necessary for complete polymerization of the unaged monomer under identical conditions. In addition, the aged methyl vinyl ketone monomer yields from about 5 to 15% more polymer than does the unaged monomer.

The polymeric methyl vinyl ketone obtained from an aged monomer is consistently a clear, colorless, hard mass, which is readily and completely soluble in organic solvents, such as acetone. In addition, it is stable even at elevated temperatures and may, therefore, be molded into articles of water-white clarity without discoloration or material change in its physical characteristics.

The following examples are given to illustrate this invention further.

*Example I*

Methyl vinyl ketone, which has been prepared from vinyl acetylene and which contains traces of vinyl acetylene and about 0.1% of hydroquinone as a polymerization inhibitor, is dried over calcium chloride and distilled at atmospheric pressure. The fraction boiling at 81.4° C. is collected separately and cooled to 5° C. Thereafter, 5 parts by weight of the distilled methyl vinyl ketone is mixed with 17.5 parts by weight of a 1% by weight aqueous solution of sodium dioctyl sulfosuccinate, and 2.5 parts by weight of a 0.2% by weight aqueous solution of potassium persulfate. The mixture is placed in a pressure container which is flushed out with nitrogen, and tumbled for 15 hours at 60° C. To 10 parts by weight of the latex of polymeric methyl vinyl ketone formed in this manner, there is added 2 parts by weight of a 0.1% aqueous solution of sodium bicarbonate to neutralize the potassium persulfate. The water is then evaporated from the latex on a steam bath, and the polymeric methyl vinyl ketone dried for one hour at a temperature of 120° C. The dried polymeric methyl vinyl ketone is insoluble in acetone.

*Example II*

Methyl vinyl ketone is polymerized in the manner set forth in Example I, except that the methyl vinyl ketone is aged for 4 days in the presence of air at a temperature of 5° C. after its distillation and before its polymerization. During the polymerization 10 cc. samples are drawn periodically from the reaction mixture, neutralized with 2 cc. of a 0.1% aqueous solution of sodium bicarbonate, evaporated on a steam bath and dried at a temperature of 120° C. for one hour. The weight of the solids is indicative of the extent to which polymerization has proceeded. The results obtained are shown as curve 1 in the accompanying figure wherein the abscissae represent the time in hours and the ordinates represent the solids content in grams per 10 cc. The dried polymeric methyl vinyl ketone obtained by working up the reaction mixture in the manner set forth in Example I is completely soluble in acetone.

*Example III*

Methyl vinyl ketone is polymerized in the manner set forth in Example II except that the ageing period between the distillation and the polymerization of the methyl vinyl ketone is increased to 7 days. The rate at which polymerization proceeds is shown as curve 2 in the accompanying figure and is considerably higher than when the monomer has been aged for only 4 days. The dried polymeric methyl vinyl ketone obtained by working up the reaction mixture in the manner set forth in Example I is completely and readily soluble in acetone.

*Example IV*

Methyl vinyl ketone is polymerized in the manner set forth in Example II except that the ageing period between the distillation and the polymerization of the methyl vinyl ketone is increased to 11 days. The rate at which polymerization proceeds is shown as curve 3 in the accompanying figure, and is slightly higher than when the monomer has been aged for 7 days. The dried polymeric methyl vinyl ketone obtained by working up the reaction mixture in the manner set forth in Example I is completely and readily soluble in acetone.

*Example V*

Methyl vinyl ketone is polymerized in the manner set forth in Example II except that the ageing period between the distillation and the polymerization of the methyl vinyl ketone is increased to 15 days. The rate at which polymerization proceeds is shown as curve 4 in the accompanying figure, and is slightly higher than when the polymer has been aged for 11 days. The dried polymeric methyl vinyl ketone obtained by working up the reaction mixture in the manner set forth in Example I is completely and readily soluble in acetone.

The ageing of the methyl vinyl ketone monomer not only improves the physical properties of the polymer obtained therefrom, but it also increases the rate of polymerization and the total yield of the polymer as may be seen from the curves in the accompanying figure.

*Example VI*

Methyl vinyl ketone, which contains traces of vinyl acetylene and about 0.1% of hydroquinone as a polymerization inhibitor, is dried over calcium chloride and distilled at atmospheric pressure. The first low-boiling fraction, amounting to less than 0.1% of the total mass and containing vinyl acetylene, is cooled to −10° C. in a worm condenser and collected in a dry ice trap. A mixture is prepared from 0.8 part by weight of this low-boiling fraction and 170 parts by weight of a monomeric methyl vinyl ketone, which has been specially purified to remove all traces of vinyl acetylene therefrom and which yields a polymer soluble in acetone. The mixture is polymerized for a period of 4 hours in the manner set forth in Example I. The dried polymeric methyl vinyl ketone, which is obtained in a yield of 0.29 grams per 10 cc. by working up the reaction mixture in the manner set forth in Example I, is insoluble in acetone.

*Example VII*

A mixture of a specially purified monomeric methyl vinyl ketone, which yields a polymer soluble in acetone, and the low-boiling fraction obtained upon distillation of a methyl vinyl ketone containing vinyl acetylene is prepared in the manner set forth in Example VI. A stream of gaseous oxygen is bubbled through 50 parts by weight of this mixture for 4.5 hours, following which the mixture is polymerized for a period of 4 hours in the manner set forth in Example I. The dried polymeric methyl vinyl ketone, which is obtained in a yield of 0.89 gram per 10 cc. by working up the reaction mixture in the manner set forth in Example I, is completely soluble in acetone.

It is to be understood that the foregoing detailed description is given merely by way of illustration and that many variations may be made therein without departing from the spirit of my invention.

Having described my invention what I desire to secure by Letters Patent is:

1. In a process for preparing polymeric methyl vinyl ketone, from methyl vinyl ketone monomer which contains vinyl acetylene as an impurity, which monomeric methyl vinyl ketone polymerizes to a dark-colored, soft, rubbery polymer with the aid of a catalyst which will cause polymerization of the methyl vinyl ketone monomer through the carbon to carbon double bond and which monomeric methyl vinyl ketone is substantially free from added polymerization inhibitors, the steps which comprise ageing the methyl vinyl ketone monomer in the presence of oxygen without forming an appreciable quantity of polymer therein, at least until the methyl vinyl ketone monomer may be polymerized with the aid of a catalyst which will cause polymerization of the methyl vinyl ketone monomer through the carbon to carbon double bond to yield a clear, colorless, hard polymer, thereafter adding to the aged methyl vinyl ketone monomer a catalyst which will cause polymerization of the methyl vinyl ketone monomer through the carbon to carbon double bond, and polymerizing the catalyst-containing methyl vinyl ketone monomer to yield a clear, colorless, hard polymer.

2. Process according to claim 1 wherein the ageing of the methyl vinyl ketone monomer is effected at a temperature of between about 0 and 10° C.

3. Process according to claim 1 wherein the methyl vinyl ketone monomer is aged for a period of at least about two hours.

4. Process according to claim 1 wherein the methyl vinyl ketone monomer is aged for a period of between about 2 and 144 hours.

5. Process according to claim 1 wherein the methyl vinyl ketone monomer is distilled prior to ageing.

6. Process according to claim 1 wherein the methyl vinyl ketone monomer is aged at a temperature of between about 0 and 10° C. and for a period of between about 2 and 144 hours.

7. Process according to claim 6 wherein the methyl vinyl ketone monomer is distilled prior to ageing.

8. Process according to claim 7 wherein the methyl vinyl ketone monomer is polymerized in an aqueous medium to form a latex.

RICHARD E. DAVIES.

REFERENCES CITED

The following references are of record in the file of this patent:

UNITED STATES PATENTS

| Number | Name | Date |
| --- | --- | --- |
| 2,088,577 | Conaway | Aug. 3, 1937 |

FOREIGN PATENTS

| Number | Country | Date |
| --- | --- | --- |
| 555,859 | Germany | Aug. 3, 1932 |
| 335,185 | Great Britain | Sept. 15, 1930 |

OTHER REFERENCES

Stobbe et al., Liebig's Annalen der Chemie, vol. 371, pp. 259, 273 to 277, 1910.

Taylor et al., J. Am. Chem. Soc., vol. 53, page 2529, 1932.